United States Patent [19]

Platt

[11] 4,080,638

[45] Mar. 21, 1978

[54] HOUSING AND TAPE PLAYBACK APPARATUS WITH IMPROVED TAPE DRIVE SYSTEM

[75] Inventor: Stephen A. Platt, Grand Haven, Mich.

[73] Assignees: Stephen A. Platt; Vernet B. Platt, both of Grand Haven, Mich.

[21] Appl. No.: 714,095

[22] Filed: Aug. 13, 1976

[51] Int. Cl.² ............................................. G11B 15/42
[52] U.S. Cl. ...................................... 360/96; 360/105; 242/201
[58] Field of Search ......................... 360/96, 137, 90; 242/198–202

[56] References Cited

U.S. PATENT DOCUMENTS

| 3,718,777 | 2/1973 | Tupaj et al. | 242/200 X |
| 3,719,364 | 3/1973 | Hessland et al. | 360/96 |
| 3,864,745 | 2/1975 | Platt | 360/96 |
| 4,001,887 | 1/1977 | Platt et al. | 360/90 |

Primary Examiner—John H. Wolff
Attorney, Agent, or Firm—Price, Heneveld, Huizenga & Cooper

[57] ABSTRACT

A chassisless tape apparatus includes a housing on which the operative components of the tape transport are mounted and which includes protective ridges extending outwardly therefrom to protect the external operation mechanism recessed within the ridges. A slide assembly mounted to the housing and on which the play back head is mounted serves to advance the drive mechanism between play back and rewind positions as well as actuate an electrical switch for activating the electrical circuits thereby providing single slide control of the tape apparatus.

2 Claims, 7 Drawing Figures

HOUSING AND TAPE PLAYBACK APPARATUS WITH IMPROVED TAPE DRIVE SYSTEM

BACKGROUND OF THE PRESENT INVENTION

The present invention relates to tape apparatus and in particular to a reliable, heavy-duty and inexpensive unit capable of withstanding hard use.

Commercially available tape apparatus of the type employed for play back and recording of, for example cassette tapes, are largely unsuitable for use in environments such as missionary work where the apparatus can be subjected to relatively hard use under less than ideal atmospheric and ambient conditions. Thus, for example, in missionary work in underdeveloped countries where the recorders are used by persons unskilled and unfamiliar with modern electrical equipment and where such equipment would be subjected to use out-of-doors in all types of weather and ambient conditions not frequently encountered by commercial units, such units due to their complexity and relatively fragile construction are unsuitable. Indeed the commercial play back units are frequently designed more from an aesthetic viewpoint and compactness than that of durability or simplicity of operation.

In U.S. Pat. No. 3,864,745 there is disclosed an manually operated tape play back apparatus. Co-pending U.S. patent application Ser. No. 584,465, Filed June 6, 1975 and entitled MANUAL TAPE APPARATUS now U.S. Pat. No. 4,001,887 and assigned in part to the present assignee also discloses a manual system together with an integral generator. While both of these systems represent significant advancements in the art, the drive mechanisms, due to their manual operation are exposed, somewhat complex and as a result subject to damage and failure if improperly used. Thus, there exists a need for an inexpensive, durable tape play back unit which can employ standard readily available flashlight cells commonly known as "D" cells and rechargeable for operating current for use in remote areas by those unskilled in the operation of sophisticated electrical equipment or handicapped and thus unable to operate the above noted manual type playback instruments.

SUMMARY OF THE INVENTION

It is the purpose of this invention to provide a very durable tape apparatus suitable of at least playback of prerecorded magnetic tapes, and one which includes as an important feature thereof, a durable case which provides for protection of the mechanical and electrical elements thereof not only from mechanical shock due to mishandling but also from the elements of weather and ambient conditions. By providing an integral case which serves also as the chassis for mounting the structural elements, a relatively inexpensive tape apparatus is formed. The apparatus incorporates a single slide mechanism which serves the function not only of mechanically advancing a playback head into position with respect to the tape, but also moving the improved and simplified drive mechanism between playback and rewind positions and actuating the electrical drive motor and amplifying circuits for the tape apparatus.

Such construction provides a very reliable, inexpensive, durable and weather resistant system particularly suited for missionary work language and instruction. The unit is suitable for "bush country" uses. Also the severely handicapped individuals can operate the slide control which can be operated even by an elbow. These and other objects, features and advantages of the present invention will become apparent upon reviewing the following description thereof together with the drawings in which:

BRIEF DESCRIPTIONS OF THE DRAWINGS

Figure 6:
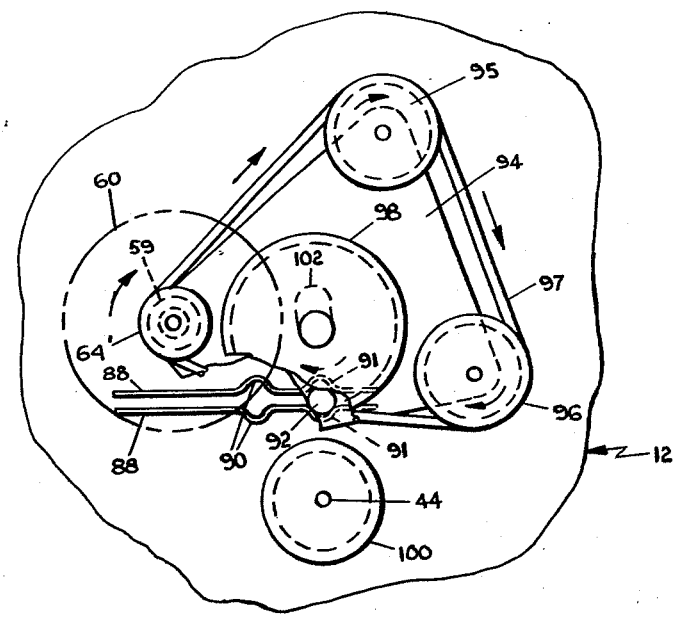
Figure 7:
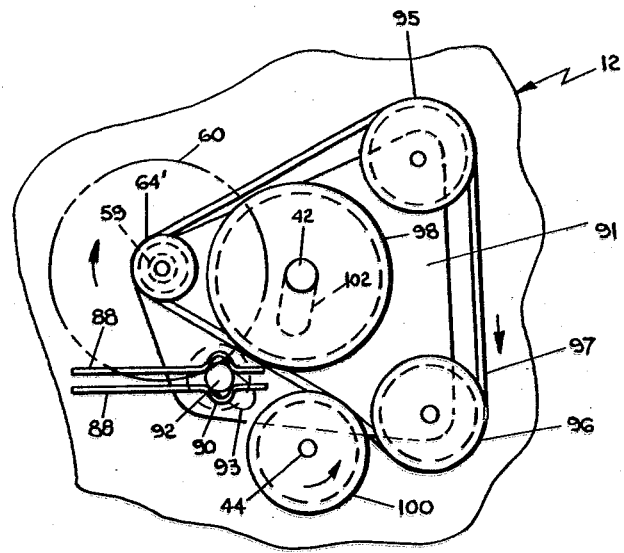

FIG. 6 is an enlarged, fragmentary plan view partly broken away of the preferred embodiment of the drive mechanism used with the tape apparatus of the present invention shown in the playback mode of operation; and FIG. 7 is an enlarged, fragmentary plan view of the preferred embodiment of the drive mechanism used with the tape apparatus of the present invention shown in the rewind mode of operation.

DETAILED DESCRIPTION OF THE PREFERRED EMBODIMENT

Figure 1:
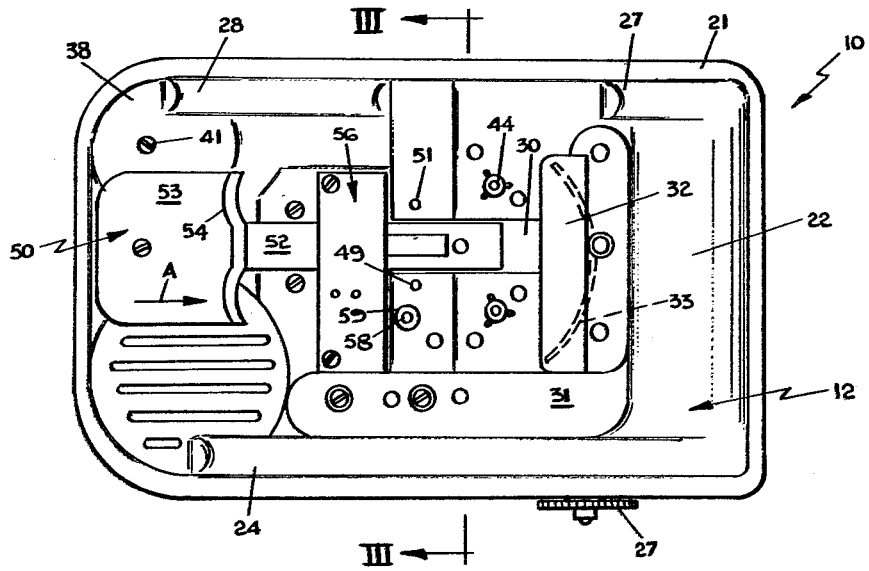
FIG. 1 is a top plan view of the tape apparatus of the present invention.
Figures 2, 3:
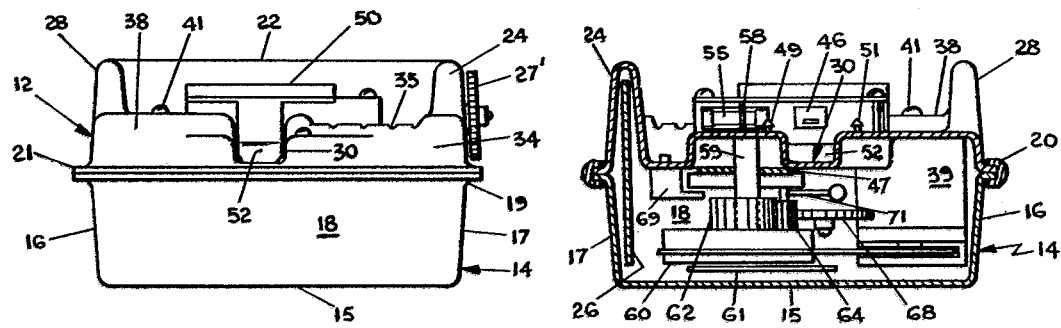
FIG. 2 is a left end view of the structure shown in FIG. 1.
FIG. 3 is a cross-sectional view of the apparatus taken along the section line III—III of FIG. 1.

Referring now to FIGS. 1–4, there is shown a tape apparatus 10 of the present invention which includes a two-piece case including an upper housing 12 and a lower housing 14. The upper housing 12 defines the support for all of the operative mechanism of the tape recorder with the lower housing 14 comprising a generally rectangular pan having a floor 15, generally vertical sidewalls 16 and 17 and opposite endwalls 18. Extending around the periphery of the junction of the sidewalls and endwalls is a horizontally extending flange 19 which is coextensive with and in mating engagement with a corresponding flange 21 of the upper housing 12. The two housing members 12 and 14 thus can be sealably joined and held together by means of bead 20 which compressibly engages flanges 19 and 21. The bead 20 is preferably made of a resilient polymeric material such as polyvinyl chloride and it has a generally U-shaped cross section as best seen in FIG. 3 and extends continuously around the case. The bead can of course be removed from the flanges to permit access to the interior of the tape apparatus.

Upper housing 12 further includes a configurated top surface having at one end a laterally extending semicylindrical integrally formed carrying handle 22 for the tape apparatus defining as well as a housing for the four D-cell batteries 25 (FIG. 4) which are employed to provide operating power. Extending longitudinally along the generally rectangular upper housing 12 from one end of the combined battery compartment and handle 22 is a first protective ridge 24 which extends along substantially the entire length of the one edge of the tape apparatus and provides a protective ridge protecting the recessed exterior mechanical components of the tape apparatus. By its internally U-shaped configuration, ridge 24 also defines a mounting area for an electrical printed circuit board 26 which includes the necessary amplifier and electrical circuits for the tape apparatus.

On a side of the housing 12 opposite ridge 24 there is provided a second ridge 28 which extends partially along the length of the tape apparatus and similarly provides a protective guard to the operative elements of the apparatus. A stub ridge 27 (FIG. 1) extending from the end of battery housing 22 opposite that of ridge 24 also provides such function.

In the central area of upper housing 12, there is formed a longitudinally extending rectangular channel 30 (FIGS. 2 and 3) integrally formed downwardly in the housing 12. Channel 30 extends from the end of the housing 12 remote from battery compartment 22 to the generally cross-sectional L-shaped cassette stop plate 32 which is riveted to the floor 31 of the housing 12. Adjacent the channel 30 at one end of housing 12 there is provided a circular speaker enclosure 34 having a plurality of louvers 35 formed therethrough for permitting sounds from a speaker 36 coupled to the output of amplifier 26 to be transmitted through the housing 12. At the same end of housing 12 on the opposite side of channel 30 there is provided a second smaller circular raised housing 38 for receiving the tape drive motor 40 (FIG. 4) which has a circular cross section and which has one end snugly fitted into a cup 39 in turn held within recess 38 and secured thereto by means of a fastening screw 41 (FIG. 2).

Thus it is seen, that the upper housing 12 is configurated not only to provide in conjunction with housing 12 a protective case for the apparatus but serves many other functions as well. Thus, it provides protective ridges for the exterior operative mechanism of the tape transport described below, provides a compartment for the batteries serving also as an integral handle; and provides a mounting area for the electrical circuit board and the associated speaker as well as the drive motor for the tape apparatus itself. As described below, the rectangular longitudinally extending channel 30 formed in housing 12 also provides means for slidably receiving the single operator controlled movable element of the tape apparatus. The various ridges and sidewalls of the housing 12 previously described define the sidewalls of the housing which are integrally joined with the peripheral lip 21. Each of the housings 12 and 14 are preferably molded of a resilient polymeric material such as ABS or other highly shock resistant and durable plastic material in a two-piece mold. Having described the stationary components of the tape playback apparatus, the description of the mechanism for advancing the tape of a cassette employed with the preferred embodiment of the present invention during playback and rewind modes of operation and the associated control therefor is now presented.

Referring to FIGS. 1 and 3, in order to provide a single control (with the exception of an amplifier volume control 27' coupled to a variable resistor on electrical circuit board 26) there is provided a slide assembly 50 (FIG. 1) which controls the electrical actuation of the motor 40 and electrical circuits 26 as well as actuates the mechanical drive for the pair of spaced takeup and rewind spindles 42 and 44 respectively (FIG. 1) while serving also as means for advancing a pickup head 46 into engagement with a tape of a cassette mounted over spindles 42 and 44 and under the cassette stop plate 32. For the sake of clearly showing the components of the tape apparatus, a standard commercially available cassette which fits over the spindles 42 and 44 facing head 46, is not shown. The slide assembly 50 provides a single control for operation of the tape transport.

Slide assembly 50 includes a generally rectangular sliding plate 52 made of a lubricious polymeric material such as Nylon which is slidable longitudinally within the rectangular channel 30 under the cassett tape. Coupled to one end of sliding plate 52 is a relatively large handle 53 having a raised configurated lip 54 permitting operation of the slide forwardly in a direction indicated by arrow A in FIG. 1 for the playback mode of operation, or rearwardly to an intermediate stop position or to an extreme rearward position for rewind of the tape cassette, the latter two positions being achieved by movement of the slide in a direction opposite that indicated by arrow A. Mounted to the slide 52 at its approximate midpoint is a pickup head assembly 56 which includes as best seen in FIG. 3 the magnetic pickup head 46 stationarily mounted to the assembly 56, and a spring loaded pivoted pinch roller 55 which engages the tape drive capstan 58 (FIGS. 1 and 3) when the slide 50 is moved in the forward position for playback with the magnetic tape being held between pinch roller 55 and the drive capstan 58. The capstan 58 is rotatably extended through upper housing 12 by means of a capstan bushing 59. The slide assembly 50 can easily be changed in the field as a unit by those of only slight skills for repairing if required.

For purposes of positioning a tape cassette on the unit, a pair of guide pins 49 and 51 are provided and extend upwardly from the floor of housing 12 and in stationary relationship thereto for accurately aligning the cassette over the spindles 42 and 44 and under the stop plate 32. A biasing leaf spring 33 mounted under plate 32 assists in loading and holding the cassette in the desired position.

Drive motor 40 includes a drive pulley 41 coupled to the output shaft of the motor for driving a flywheel 60 into which the capstan 58 extends and is secured. A drive belt 43 extends between the flywheel 60 and pulley 41 and under a drive belt guide 45 mounted to the end of motor 40. Attached to flywheel 60 is a drive gear 62 (FIG. 3) extending upwardly from the flywheel and having an annular opening concentric with its axis for receiving and underlying the capstan bushing 59 which extends through casing 12 and is supported in part by bushing mounting plate 47 (FIG. 3). Plate 47 is riveted to housing 12. The flywheel is thus rotatably supported by the capstan bushing 59 with the capstan extending coaxially through the bushing and having its end secured to the center of the flywheel 60. Such an arrangement provides for automatic alignment of the capstan with the flywheel and drive gear 62 with the use of a single bushing 59.

In order to hold the flywheel 60 into position, a flywheel mounting plate 61 attached to a pair of upstanding posts 63 projecting upwardly from a stationary plate 65 secured to housing 12. Plate 61 engages the end of the capstan 58 thereby holding the capstan in vertical alignment.

Figure 5:
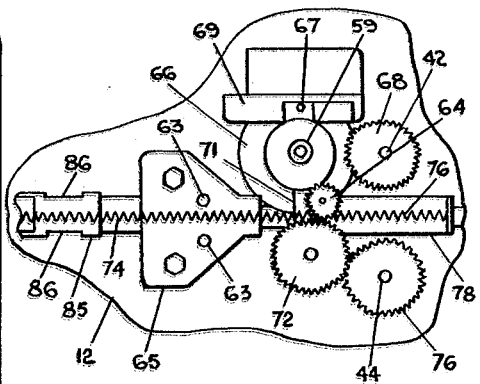
FIG. 5 is an enlarged, detailed view of the drive mechanism shown in FIG. 4 with the flywheel and other obstructing elements removed.

The drive gear 62 in turn engages a movable drive gear 64 which is coupled to a pivoted plate 66 actuated by the slide member as noted below for moving the drive gear 64 between engagement with a takeup gear 68 coupled to spindle 42 for playback operation or into engagement as shown in FIG. 5 with the rewind gear 70 coupled to spindle 44 through a reversing gear 72 which is positioned between drive gear 64 and rewind drive gear 70. Gears 70 and 72 are supported in fixed relationship to one another and are mounted on a common support arm (not shown) suitably secured to housing 12. Gear 64 swings in an arc with respect to the pivoted plate 66 around the capstan bushing 59 such that it maintains continuous engagement with the drive gear 62 when moving between the playback and rewind positions as now discussed.

Pivot plate 66 (FIGS. 3 and 5) is generally circular and surrounds and is pivotally secured to the capstan bushing 59. On one side of the plate 66 there is provided a stop post 67 which extends between a notch plate 69 mounted to the lower side of housing 12 to limit the rotatable motion of plate 66 between the playback and rewind positions. Extending outwardly from the opposite side of plate 66 is a lever arm 71 which extends under the slide channel 30 as seen in FIG. 3. A first spring 74 (FIG. 5) has one end coupled to lever arm 71 and its opposite end coupled to a bracket 73 extending through a notch 75 formed in housing 12 and coupled to an extending downwardly from slide 52. Thus, motion of the slide causes the spring 74 to change its length, and therefore the force applied to lever arm 71. The slide continuously covers notch 75 to maintain the housing sealed. Coupled from the opposite end of lever arm 71 is a second spring 76 anchored at its remote end to a bracket 78 in turn pivotally mounted to the housing 12 at a position remote from the connection spring 76 to a downwardly projecting lip of bracket 78. Bracket 78 is secured to housing 12.

Thus, movement of slide 52 through handle 53 causes the rotation of cam plate 66 by the tension change of springs 74 and 76 causing the drive gear 64 to engage one of the takeup or reversing gears 68 and 72 respectively. In the forward position of slide 52, gear engages takeup gear 68, in the extreme reverse position of slide 52 (to the left in FIG. 1), gear 64 engages reversing gear 72 for reversing motion. In the intermediate of stop position, gear 64 is disengaged and electrical power to the motion and amplifier is disconnected by the structure now described.

The electrical switch assembly 80 (FIG. 4) associated with the slide assembly 50 comprises a pair of spring contacts 82 and 84 insulatably mounted on opposite sides of the interior sidewalls of channel 30 and includes free ends 81 which extend to the sidewalls of housing 12 and bias the contacts 82 and 84 against the sidewalls of the channel 30 integrally formed in housing 12. Coupled to these contact arms are a pair of electrical leads 23 which extend between the battery pack 25 and amplifier 26.

Figure 4:
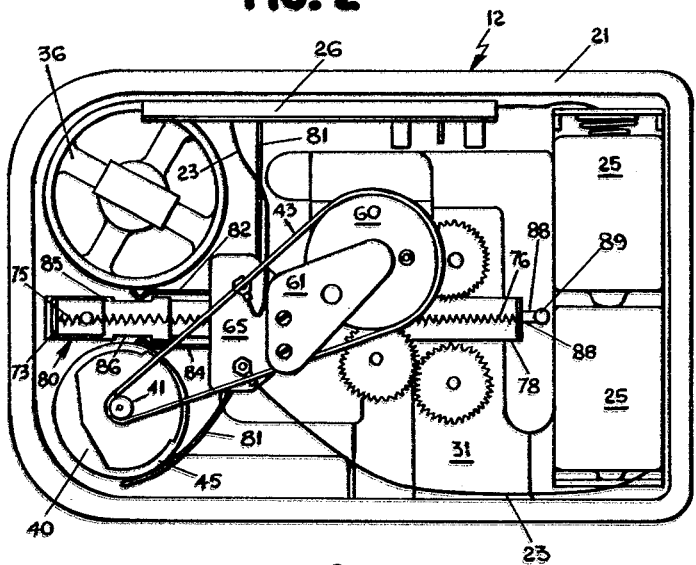
FIG. 4 is a bottom plan view of the tape apparatus with the bottom cover removed showing one embodiment of the drive mechanism therefor.

Extending between contacts 82 and 84 is an electrically conductive slide member 85 having a U-shaped configuration overlying the U-shaped interior surfaces of channel 30. A pair of apertures 86 are cut on the opposite sidewalls of member 85 defining a central zone whereby contacts 82 and 84 do not engage the conductive member 85 as shown in FIG. 4. The U-shaped conductive member 85 is coupled to slide 52 such that as slide 52 is advanced into the playback position or drawn rearwardly to the rewind position, the legs of conductor 85 forward and aft of the notches 86 extend between contacts 82 and 84 thereby completing the electrical circuit between conductors 23 for coupling electrical power to the amplifying circuit 26 and motor 40. By virtue of the reversing gear arrangement, motor 40 is driven in the same direction for playback and rewind modes of operation with the tape direction being reversed by the reversing drive of spindles 42 and 44.

In order to assure that the slide 52 can be held in either a playback or rewind position, a pair of spring detents are provided. The spring detents comprise a pair of spaced spring steel wires 88 anchored by plate 65 at one end and extending to a post 89 at the opposite end. Post 89 is secured to housing 12. As best seen in the embodiment shown in FIGS. 6 and 7, the spring wires 88 include deformed segments 90 and 91 which surround a post 92 attached to slide 52 and extending through a suitable notch formed through housing 12 such that the post 92 will be releasably held between the wires 88 in either the playback position or rewind position as shown in FIGS. 6 and 7 respectively.

Referring now in detail to the drive mechanism disclosed in FIGS. 6 and 7 which constitutes a preferred embodiment of the tape transport, the remaining structure other than the drive gears as shown in FIGS. 1–5 is identical for the FIGS. 6 and 7 embodiment and accordingly is not shown or described. In place of the drive gears shown in detail in FIG. 5, a drive pulley arrangement is employed which also eliminates the pivot plate 66 in the first embodiment.

In the drive arrangement shown in FIGS. 6 and 7 below the flywheel 60 there is provided a drive pulley 64' in place of a drive gear 64 shown in the first embodiment. Pivotally coupled to the capstan bushing 59 is a carrier plate 94 on which there is positioned at opposite corners tension pulleys 95 and 96. A drive belt 97 in the form of an O-ring surrounds drive pulley 64' and the tension pulleys 95 and 96. Coupled to the takeup spindle shaft 42 is a takeup drive pulley 98. A rewind drive pulley 100 is coupled to the rewind spindle shaft 44.

The carrier plate 94 is pivoted about the capstan bushing 59 and guidably surrounds the spindle shaft 42 by means of an arcuate slot 102 permitting the pivotal motion of carrier plate about bushing 59. Post 92 extending from slide 52 downwardly through a notch in the upper housing 12 also extends through an aperture 93 in carrier plate 94 and serves as the drive connection between slide 52 and the pivotable carrier plate 94. Thus, when slide 52 is moved to a forward position as shown in FIG. 6, carrier plate 94 is rotated in a counterclockwise direction as seen in FIG. 6 such that the inner side of drive belt 97 engages drive pulley 98 of the takeup spindle 42 for advancing the tape past pickup head 46 during the playback mode of operation. When the slide is drawn rearwardly for the rewind mode of operation, carrier plate 94 is rotated clockwise such that the drive belt 97 disengages pulley 98 and its outer edge engages rewind pulley 100 associated with spindle 44 and drives pulley 100 in a direction for the rewind of the tape within the cassette.

By extending belt 97 around the drive and rewind pulleys for alternative contact with such pulleys, the desired tape reversal can be achieved without reversing motor 40. With both of the tape transports disclosed, the pickup head is drawn away from the tape during rewinding. This rewind speed is selectable by the gear ratio in the first embodiment or the pulley diameter in the second embodiment to be approximately twice that of the playback speed of 1⅞ inches per second. Naturally, greater or lesser speeds can be achieved by a selection of the drive components.

It will become apparent to those skilled in the art that various other modifications to the preferred embodiment disclosed and described herein can be made by those skilled in the art without departing from the spirit and scope of the present invention as defined by the appended claims.

The embodiments of the present invention in which an exclusive property or privilege is claimed are defined as follows.

1. A tape playback apparatus operator controlled by a single actuating slide assembly comprising:

housing means for supporting a pair of spaced tape reel drive spindles, an electrical motor and selectively actuated drive means coupling said motor to said drive spindles for playback and rewind modes of operation;

operator actuated slide plate means slidably mounted to said housing and including thereon a tape pickup head, said slide including an actuating post coupled to said drive means for controlling said drive means between playback and rewind modes and electrical switch means mechanically coupled to said slide for actuation by said slide and electrically coupled to said electrical motor for actuation of said motor wherein said drive means includes a capstan bushing mounted to said housing means and including a capstan rotatably extending therethrough, a flywheel concentrically coupled to said capstan and a drive pulley mounted to said flywheel, means coupling said motor to said flywheel for the rotation of said flywheel and capstan and a pivoted carrier plate positioned to be pivoted about said capstan bushing and including a pair of spaced tension pulleys rotatably mounted thereto to support a drive belt extending around said drive pulley and said pair of spaced tension pulleys such that said drive belt extends between said spaced spindles, spindle drive pulleys mounted on said pair of spindles, respectively, so as to selectively engage said drive belt, and said actuating post extending between said pivoted carrier plate for selectively pivoting said plate between a first position in which said drive belt engages a first spindle drive pulley and a second position in which said drive belt engages a second spindle drive pulley.

2. The apparatus as defined in claim 1 wherein said housing means includes a slide receiving channel formed therein and wherein said slide is slidably extended into and supported by said channel, and said switch means includes a pair of spring contacts positioned within said housing means and spaced from one another with a conductive member includes spaced legs adapted to selectively engage said spring contacts in the playback and rewind modes of operation for actuating said motor.

* * * * *